US005364202A

United States Patent [19]
Ettelbrueck

[11] Patent Number: 5,364,202

[45] Date of Patent: Nov. 15, 1994

[54] HOLDING DEVICE FOR HOLLOW-CYLINDER PRINTING FORMES

[75] Inventor: Ruediger Ettelbrueck, Aschheim, Germany

[73] Assignee: Maschinenfabrik Kaspar Walter GmbH & Co., KG, Germany

[21] Appl. No.: 83,573

[22] Filed: Jun. 30, 1993

[30] Foreign Application Priority Data

Jul. 22, 1992 [DE] Germany ............................ 4224252

[51] Int. Cl.[5] ............................................ F16D 1/10

[52] U.S. Cl. .................................... 403/322; 403/368; 492/47; 101/407.1

[58] Field of Search ...................... 101/407.1, 375–378; 400/660, 659; 492/18, 47; 269/48.1; 403/322, 368, 321, 325, 365, 367

[56] References Cited

U.S. PATENT DOCUMENTS

| | | | |
|---|---|---|---|
| 3,679,244 | 7/1972 | Reddy | 287/20 R |
| 4,272,872 | 6/1981 | Hess et al. | 492/4 |
| 4,367,971 | 1/1983 | Coren | 403/330 |

FOREIGN PATENT DOCUMENTS

| | | |
|---|---|---|
| 59-16753 | 1/1984 | Japan . |
| 61-263754 | 11/1986 | Japan . |

*Primary Examiner*—Edgar S. Burr
*Assistant Examiner*—Lynn D. Hendrickson
*Attorney, Agent, or Firm*—Finnegan, Henderson, Farabow, Garrett & Dunner

[57] ABSTRACT

The holding device for hollow-cylinder printing formes comprises two adaptor rings (4) which are pressed into the free ends of the hollow cylinder (1) so as to form a seal and which are held under these circumstances in a latched condition by a spring-preloaded latch mechanism (5, 6). Because of the centred adaptor rings (4) a bulky and expensive mounting by means of plug-in spindle cone pieces and pressure pieces is unnecessary.

3 Claims, 2 Drawing Sheets

HOLDING DEVICE FOR HOLLOW-CYLINDER PRINTING FORMES

DESCRIPTION

Figure 1A:
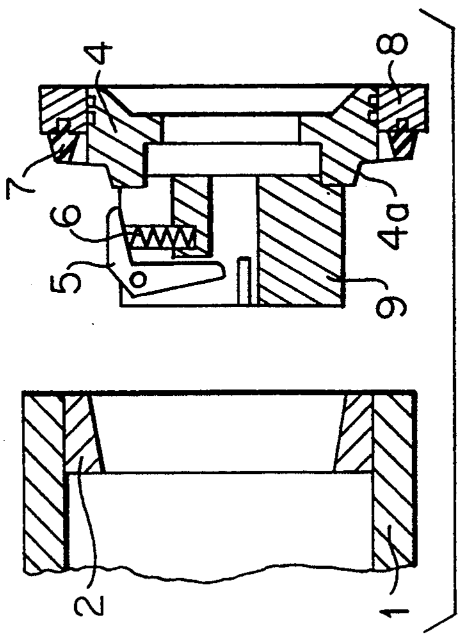

The invention relates to a holding device for printing formes, constructed as hollow cylinders, during the forme production, in particular in the electroplating shop.

Hollow-cylinder printing formes are primarily used in package printing. In order to be able to process such hollow cylinders during the forme production, in particular in the electroplating shop, it is necessary to adapt the cylinders at the ends so that both the necessary high current densities and an adequate torque can be transmitted in the electroplating installations. In addition, the leak-tightness has to be ensured, i.e. electrolyte must not get into the interior of the hollow-cylinder printing forme.

Hitherto hollow-cylinder printing formes have mainly been held by plug-in spindles which are hard to handle. For this purpose, a spindle is inserted through the cylinder and cone pieces, pressure pieces and cover tubes are pushed on at the face ends. These plug-on parts are jointly clamped against one another by means of nuts and thus clamp the hollow cylinder. This type of mounting is obviously rather expensive. Further solutions are known in which the adaptation is carried out by means of an expensive crane system.

The object of the invention is to provide a spatially small, technically low cost holding device for hollow cylinders of the type mentioned and for the purpose explained.

A holding device for hollow-cylinder printing formes as specified in the preamble of Patent claim 1 to comprise, according to the invention, one round plate in each case which is inserted into the hollow cylinder at the two free ends and is firmly joined to the hollow-cylinder inside wall and which has a conical axial bore, one adaptor ring in each case which is to be inserted in the conical axial bore in an interlocking manner and which has, on the outside, a circumferential flange shoulder with annular seal which presses against the cylinder end wall, and by one latching device in each case which is mounted at the end of the adaptor ring facing the inside of the hollow cylinder in each case and which comprises a plurality of spring-preloaded latches which are arranged in a star shape and which, when the adaptor ring is pressed into the respective hollow-cylinder end, fit behind the inside end face of the adaptor ring and secure the adaptor ring against dropping out.

The spatially small adaptor pieces which are plugged into the conical bore of the round plates fixed on the cylinder inside wall at the two end faces are clamped by the latch mechanism. This prevents the adaptor from falling out again after being pressed into the conical round-plate bore. The flange shoulders which are mounted on the outside on the adaptor rings and which have a seal which presses against the cylinder end face ensure a certain additional axial clamping and also a secure seal against the penetration of electrolyte into the inside of the hollow cylinder.

The spring-preloaded latches which are arranged in star form spread out over the inside end-ring face of the respective round plate. In order to be able to pull off the firmly clamped adaptor ring at the end of a working process, a pin by means of which the latches can be unlocked against the force of the spring preloading is introduced into the axial central bore of the respective adaptor ring. The adaptor ring can then easily be removed.

In conjunction with a suitably adapted crane transport system, the adaptor parts according to the invention offer additional advantages in handling the hollow-cylinder printing formes in an electroplating installation. Thus, the hollow cylinders can be safely transported by means of a lifting beam which picks up the hollow cylinder in an interlocking manner by means of clamping jaws. The necessary current and the torque for rotating the hollow cylinder in the electroplating installation can be guaranteed by means of sleeves which are present in the electroplating installation inside axially displaceable sealing tubes which prevent the penetration of electrolyte.

Figure 1B:
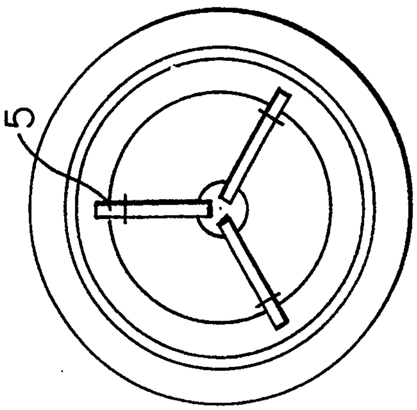
Figure 2A:
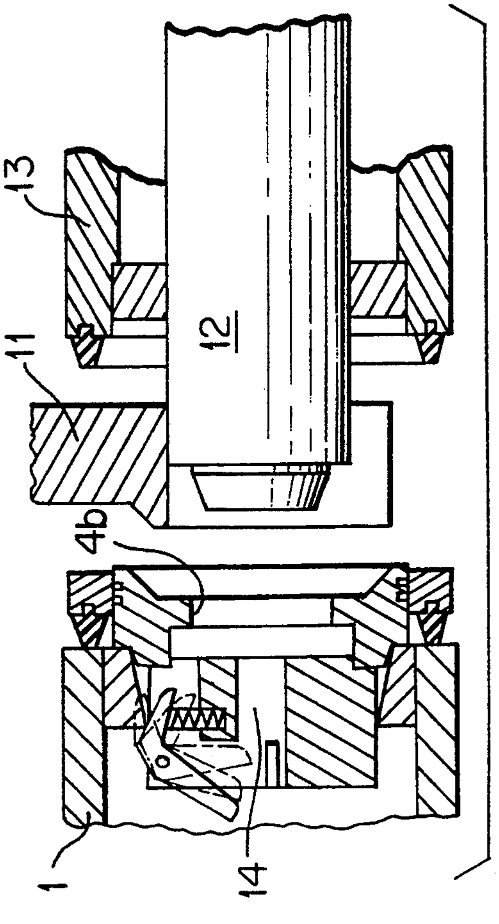
Figure 2B:
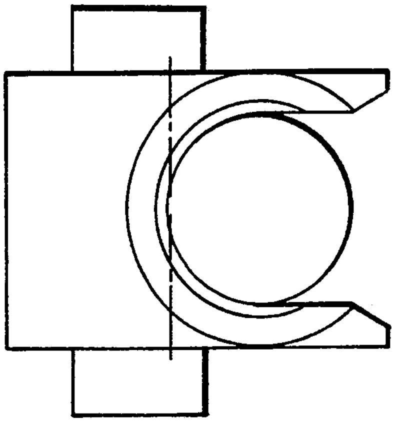
Figure 3:
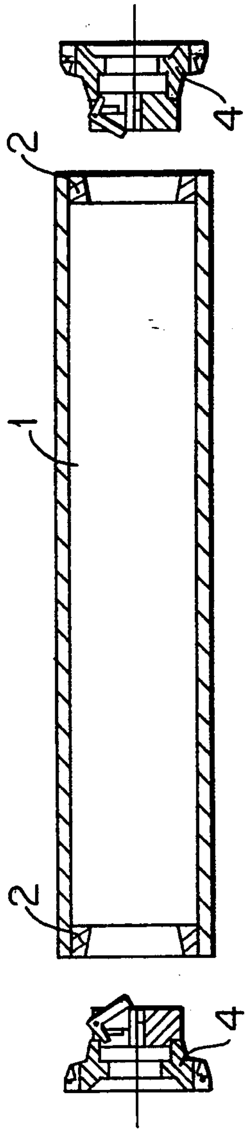
Figure 4:
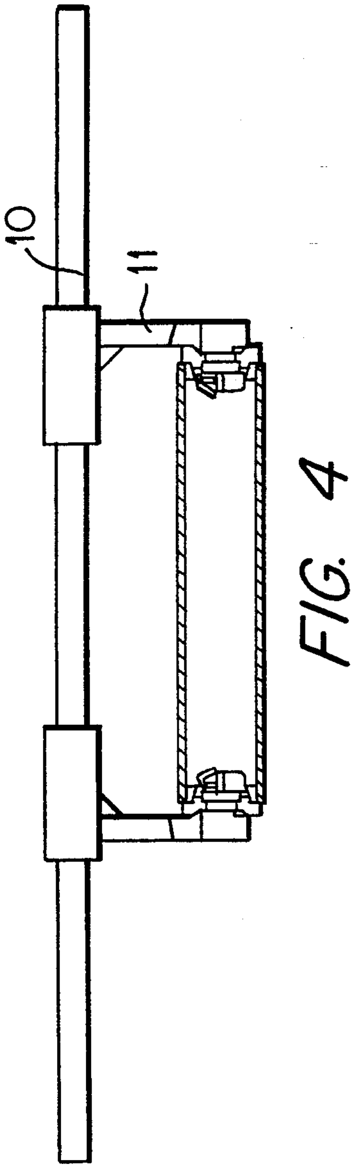
Figure 5:
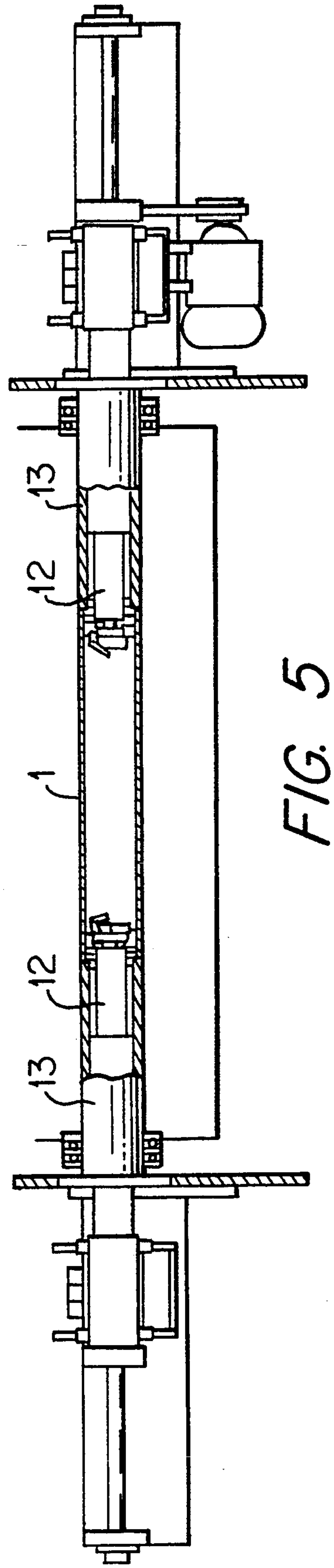

The invention and advantageous details are explained below in greater detail with reference to the drawing in exemplary embodiments. In the drawing:

FIG. 1A: shows an exploded cross-sectional view of an adaptor ring with latch mechanism in coordination with a hollow-cylinder printing forme;

FIG. 1B: shows a partial end view of FIG. 1A;

FIG. 2A: shows an exploded cross-sectional view of an adaptor ring clamped to the hollow cylinder during the preparation of a crane transport to an electroplating installation;

FIG. 2B: shows a partial end view of FIG. 1A;

FIG. 3: shows a hollow cylinder with associated adaptor pieces;

FIG. 4: shows the basic representation of the transport of a prepared hollow cylinder by means of a crane, and FIG. 5: shows the arrangement of a hollow cylinder, prepared for electroplating treatment, in an electroplating installation.

Mutually corresponding parts are marked in all the figures with the same reference symbols.

FIG. 1A reveals a face end of a hollow-cylinder printing forme 1 (hereinafter referred to only as hollow cylinder) into which a ring, referred to as round plate 2, having a conical inside bore is inserted. An essential feature of the holding device according to the invention is an adaptor ring 4 which is pressed into the axial bore of the round plate 2 and in doing so, as can be seen from FIG. 2A, engages in an interlocking and non-positive manner with the conical inside bore of the round plate 2 because of a conical axial shoulder 4A.

On the side to face the inside of the hollow cylinder 1, the adaptor ring 4 is joined to a holding ring 9 whose diameter is slightly smaller than the inside end diameter of the round plate 2. The holding ring 9 is provided with a plurality of axial slots which are offset, in the preferred embodiment shown in FIG. 1C, by 120° with respect to each other in each case and which serve in each case to receive a latch 5 which, in FIG. 1B, is pretensioned upwards (outwards) in an obvious manner by a spring 6.

As soon as the adaptor ring 4 is pressed into the conical round-plate bore, the spring-preloaded latch 5 latches behind the inside end face of the round plate 2, thereby clamping the adaptor ring 4 in the axial direction. In this position, the annular seal 7 in the annular flange shoulder 8 now presses, as can be seen from the left part of FIG. 2, against the end face of the hollow cylinder 1.

As soon as the adaptor rings 4 have been pressed into the end-face openings of the hollow cylinder 1 (cf. FIG. 3), the hollow cylinder 1 can be lifted by means of a lifting beam 10 having axially displaceable interlocking and non-positive clamping jaws 11 in order to be transferred to the electroplating installation shown in FIG. 5. In the electroplating installation, sealing tubes 13 held by sleeves 12 are mounted prior to the actual processing. Under these circumstances, the sleeves 12 engage in a suitably matched axial bore 4b of the adaptor ring 4, thereby ensuring safe guidance and current and torque transfer, along with complete sealing at the same time.

In order to remove the adaptor rings 4 after completion of the electroplating processing, the spring-preloaded latch mechanism comprising the latch 5 can be released by means of a pin which is not shown by pushing the pin into the bore 14, so that the adaptor rings 4 can be removed for reuse elsewhere.

I claim:

1. A holding device for printed formes of hollow cylinders during the forme production, in particular in an electroplating shop, the holding device comprising:

a pair of round plates each having an inner diameter with a conical axial bore and an outer diameter inserted into the hollow cylinder, one of said pair of plates at each of two free ends of the hollow cylinder, the outer diameter of the round plate firmly joined to the inside wall of the hollow cylinder;

a pair of adaptor rings, each having a annular flange shoulder, an annular seal, and a conical axial shoulder, the conical axial shoulder of one adaptor ring inserted into the conical axial bore of each round plate, the annular seal being between the annular flange shoulder and the conical axial shoulder, the annular seal being pressed against the end wall of the hollow cylinder; and a pair of latching devices, one of said pair of latching devices mounted at the end of each adaptor ring facing the inside of the hollow cylinder, each latching device having a plurality of spring-preloaded latches arranged in a predetermined configuration, such that when the adaptor ring is pressed into the respective ends of the hollow cylinder, the latches fit behind the inside end face of the round plate.

2. The holding device according to claim 1, wherein each adaptor ring has an axial bore providing an opening to receive a pin for releasing the latches from a clamped position by swivelling the latches against the respective spring preloading.

3. The holding device according to claim 1 or 2, wherein the latching device has three latches arranged in a mutual angular spacing of 120° anchored in a swivellable manner in a holding ring joined to the adaptor ring.

* * * * *